3,079,405
MENADIONE COMPOSITION AND PROCESS FOR ITS MANUFACTURE

William Galler, 986 Wateredge Place,
Hewlett Harbor, N.Y.
No Drawing. Filed Dec. 7, 1960, Ser. No. 74,231
6 Claims. (Cl. 260—396)

This invention relates generally to methods for manufacturing organic chemical compounds and, more particularly, it relates to improved methods for making, in substantially pure state, the synthetic naphthoquinone derivative having the physiologic properties of vitamin K, 2 - methyl - 1,4 - naphthoquinone, commonly known as menadione. The invention also relates to such menadione as a new article of manufacture having greatly improved physical properties as compared with U.S.P. grade menadione, for example.

This application is a continuation-in-part of my copending application Serial No. 542,526, filed October 24, 1955, now abondaned.

It is known that B-methylnaphthalene may be oxidized with chromic oxide under mild conditions to produce menadione. Usually this oxiation is performed in an aqueous acetic acid reaction medium, using an alkali metal bichromate as the oxidizing agent, and the crude reaction product, in grossly contaminated form, is recovered from the reaction mixture. This crude product, comprising at best about 90% by weight menadione on a dry basis, is a yellowish-red to brown solid, melting at about 90° C. at most, and it must be subjected to purification to obtain a product suitable for medicinal use.

Pure menadione is a bright yellow, crystalline solid, having a very faint acrid odor and being irritant to mucous membranes, respiratory passages and skin. For compliance with the standards set forth in the Pharmacopeia of the United States, the menadione product must comprise a minimum of 98.5% by weight, on an anhydrous basis, of menadione and it must melt at 105° C. to 107° C. According to the methods of purification presently employed in the commercial production of U.S.P. grades of menadione, the reaction mixture containing the aforementioned crude product is diluted with water, filtered or centrifuged to separate the crude menadione as a filtration residue or centrifuge cake, this crude product is washed with water until it is substantially free of water soluble impurities, and then the material is recrystallized at least three times from ethanol.

It will be obvious that this purification procedure has at least several very important disadvantages: the repeated recrystallizations from ethanol necessitates measures for solvent recovery and requires precautions and safety controls incident to proper handling of highly inflammable, hot solvents; a considerable period of time is required for completion of the purification; and the cost of skilled labor and investment in specialized equipment materially add to the cost of production of the finished pure product. Furthermore, the repeated washings and recrystallizations inevitably result in substantial losses of the product. Prior to the present invention, however, no method has been found to produce substantially pure menadione, essentially free of tarry oxidation by-products, than by the elaborate purification procedure above described.

One of the objects of this invention is to provide a new and improved procedure for the purification of menadione, starting with the crude product contaminated by tarry oxidation by-products, that eliminates the repeated washings and recrystallization steps of the prior art procedure hereinabove described.

Another object of this invention is to provide a novel purification procedure of the type aforesaid that eliminates need for elaborate solvent recovery measures and that eliminates use of hot, inflammable organic solvents with the hazards that are attendant upon their use.

A further object of this invention is to provide a procedure for purifying menadione that, by comparison to the prior art procedure above described, is less costly in labor, consumes less time, and that avoids need for use of highly specialized, costly equipment with the incident need for investment therein.

Other objects of this invention will be apparent hereinafter as the description of the invention proceeds.

The crude starting material utilized in the process of this invention is impure menadione contaminated with tarry oxidation by-products resulting from oxidation of B-methylnaphthalene with chromic oxide but substantially free of water soluble contaminants or impurities. The preferred starting material is the washed filtration residue or centrifuge cake obtained from filtration or centrifugation of the diluted reaction mixture following oxidation of B-methylnaphthalene with chromic oxide, or, if desired, the tarry solids recovered from mother liquors resulting from recrystallization of menadione may be used. For convenience, these starting materials will be referred to hereinafter as crude menadione with the understanding that the term has this thus limited singnificance.

In accordance with the novel process of this invention, the crude menadione starting material is subjected to a leaching operation at ordinary room temperature or, preferably, at a temperature slightly higher than ordinary room temperature, say about 30° C. to 32° C.; the leaching solvent is removed as rapidly as possible, say by filtration or centrifugation; then the desired purified product, substantially free of tarry materials and other contaminants, is recovered. This product has a purity of at least 92%, i.e., is comprises at least 92% by weight menadione, usually between 92% and about 95.5%. If desired, an even purer product may be obtained by recrystallization once from ethanol, although this further refinement is unnecessary in many instances. The leaching solvent used is an organic solvent, selected upon the basis of certain critical criteria hereinafter set forth in detail, and the leaching operation may be conducted, at choice, as a continuous process or as an intermittent process using successively small amounts of the selected solvent.

The higher the temperature is at which the leaching is performed, the greater is the loss of menadione through solution in the leaching solvent; leaching at low temperatures has the disadvantages that, under these conditions, the viscosity of the tarry contaminants in the menadione is increased and their solubility in the leaching solvent is diminished, thus larger quantities of the solvent must be used to effect the desired degree of purification with resultant increase in the difficulty of handling and removing the solvent containing the dissolved contaminants from the purified material. In practical utilization of the process according to this invention, the leaching operation is conducted at such a temperature and using such volume of solvents that the leaching exudate, at the conclusion of the leaching operation, runs substantially free of tarry residue upon evaporation of a test sample. Variation of these interrelated parameters, operating temperature, volume of solvent used and rate of solvent removal, may be made within the spirit of this invention as will be understood by those versed in the chemical arts.

The choice of the leaching solvent employed in practice of the process of this invention, as above mentioned, is of critical import. The physical criteria of selection are as follows: it must be a liquid having a low viscosity and low vapor pressure at ordinary room temperatures, and it must not dissolve appreciable proportions of menadione under the conditions of use. The chemical criteria of selection are: it must be a low molecular weight organic compound that, in its molecular structure, does not contain sulfur, nitrogen, phosphorus, arsenic, boron, titanium, or silicon; that does not react with menadione; and that is chosen from the group consisting of lower alkanes and alkanols, monocyclic saturated aliphatic hydrocarbons, monocyclic aromatic hydrocarbons, lower dialkyl ethers, lower dialkyl ketones, lower alkyl-monocyclic saturated aliphatic ethers, lower alkyl-monocyclic aromatic ethers, and halogenated aliphatic and aromatic hydrocarbons.

Among the solvents satisfying the foregoing criteria of selection that may be used satisfactorily in practicing the novel process according to this invention are the following: isopropanol, carbon tetrachloride, chloroethane, 1,1,1-trichloroethane, hexane, cyclohexane, ethylene dichloride, perchloroethylene, propylene dichloride, ethyl acetate diisopropyl ether, cyclohexyl methyl ether, methyl phenyl ether, methyl ethyl ketone, toluene, monochlorobenzene and bromobenzene.

Certain solvents, for example, the alkanols and other polar organic liquids that normally contain appreciable proportions of water, are less to be preferred as a class than the solvents that normally are water-free, such as carbon tetrachloride, because the presence of water in the leaching solvent materially reduces its capacity to dissolve the tarry impurities present in the crude menadione. The higher alkanols, which are readily available in anhydrous state, have the disadvantage that, like benzene, they may dissolve excessive quantities of menadione as compared, say, to chlorobenzene. Because carbon tetrachloride has an optimum of desired properties, it is the presently preferred leaching solvent.

In accordance with the presently preferred embodiment of this invention, crude menadione is comminuted to a reasonably fine degree of subdivision, say about U.S.B.S. No. 20, then it is loaded into a suitable leaching vessel, for instance, a Büchner funnel, and light pressure is applied to make the mass compact and free of direct channels through which the leaching solvent otherwise might pass. The selected solvent, which preferably is carbon tetrachloride, then is added in an amount sufficient to flood the menadione and, after a period has elapsed sufficient for the solvent to dissolve tarry materials present in the crude menadione, the solvent and dissolved impurities are removed from the purified menadione which remains as a residue. This product, which is recovered in substantially quantitative yield, is a canary-yellow solid, melting with the range 100° C. to 104.5° C., and comprising at least 92% by weight menadione.

It will be noticed that this purification procedure is a single step operation and, in contrast to the prior art procedure heretofore described, it does not involve use of hot, inflammable organic solvents nor does it involve time-consuming recrystallization of the product with its inherent waste of the material being purified. The product obtained in this manner is entirely satisfactory for all uses except those requiring a substance of the highest purity, say, higher than 98% by weight menadione, and for these uses, a single recrystallization serves to remove substantially all remaining impurities, yielding a substance melting at 105° C. to 107° C. The product obtained without recrystallization is of sufficient purity for commercial use in animal feeds.

One of the remarkable results of the purification procedure according to this invention is that the menadione product obtainble thereby is possessed of certain properties not possessed by U.S.P. menadione or by the crystallized menadione which may be obtained in accordance with Hyman et al. U.S. Patent No. 2,402,226. In particular, the purified product obtainable by the process of this invention is substantially free of tendency to cake when stored at ordinary room temperatures, whereas the prior art and the U.S.P. materials, after storage for merely a brief period, say a week, cohere into a hard, lumpy mass. The new product is essentially free of tendency to acquire electrostatic particle charges, which is a property of very great practical importance because it does not form dusts of suspended particles, in contrast to the prior art and U.S.P. materials which do readily acquire such particle charges and which do form dusts that are dangerous to persons handling the material. The new product, in further contrast to the prior art and U.S.P. materials, readily may be mixed with other comminuted substances in a blender or the like to yield a truly physically homogeneous product in finely divided state. When an attempt is made to produce a mixture utilizing the prior art and U.S.P. products under the same conditions, the resultant material is lumpy and physically non-homogeneous, even though initially the menadione is in finely divided state.

To facilitate a fuller and more complete understanding of the subject matter of this invention and of how the invention best may be practiced, several specific examples of preferred methods of practicing the invention herewith follow, but it is clearly to be understood that these examples are provided by way of illustration, merely, and are not to be construed as imposing any limitations on the invention as defined by the subjoined claims.

*Example 1*

A large Büchner funnel is mounted in a suitable support and connected with a suitable flask for receiving the filtrate and a vacuum line is connected to the flask through suitable means for controlling application of the vacuum. About 10.3 pounds of crude menadione, essentially free of water soluble contaminants and impurities but contaminated with tarry by-products from oxidation of B-methylnaphthalene, is divided to facilitate leaching and placed on the bed of the filter. The material is lightly tamped to make the mass of more or less uniform compactness and to eliminate direct channels through the material through which the leaching solvent might pass, then the mass is flooded with about one-sixth gallon of carbon tetrachloride. After a few moments, vacuum is applied, causing the solvent bearing impurities from the menadione to be drawn into the flask. The vacuum then is released and the residue remaining on the filter bed again is flooded with about one-sixth gallon of carbon tetrachloride and, after a few moments, the vacuum again is applied and the leaching solvent is passed into the flask. This is repeated with a final one-sixth gallon of carbon tetrachloride and, after the solvent has been removed, the purified material is removed from the funnel. It is found to be a canary-yellow solid, weighing about 9.8 pounds, melting in the range 100° C. to 104.5° C., free-flowing, essentially free of tendency to cake, form dusts of suspended particles, and acquire electrostatic particle charges. It readily mixes with other comminuted materials in a blender to yield a free-flowing, substantially lump-free, physically homogeneous, finely divided product.

*Example 2*

The procedure described in Example 1 is repeated with the sole modification that the carbon tetrachloride there used is replaced with ethyl acetate. The product obtained is identical in properties with that described in Example 1, but it is obtained in a slightly higher yield, 9.85 pounds.

*Example 3*

The procedure described in Example 1 is repeated with the sole modification that the carbon tetrachloride there used is replaced with isopropanol. The product obtained is identical with that obtained as in Example 1, but it is obtained in a somewhat higher yield, 9.95 pounds.

*Example 4*

The procedure described in Example 1 is repeated with the sole modification that the carbon tetrachloride there used is replaced with benzene. The product obtained is identical in properties with that described in Example 1 but it is obtained in somewhat lesser yield, 9.67 pounds.

*Example 5*

The product obtained as described in Example 1 is recrystallized from a minimum quantity of hot ethanol. The highly purified crystalline material thus obtained fully satisfies the standards for menadione U.S.P., set in the Pharmacopeia of the United States, 14th Revision, i.e., it contains a minimum of 98.5% by weight of menadione, on an anhydrous basis, and its melting point is within the range 105° C. to 107° C.

Samples of material prepared in accordance with the general method described in Example 3, which is representative of the novel product of the present invention, were compared with U.S.P. menadione obtained from a commercial source. Using identical standard melting point procedures, the melting point range of the U.S.P. product was found to be 105–107° C., while the melting point range of the product of the present invention was found to be between 100° C. and 104.5° C. Using a standard assay procedure based on reduction with acidzinc and titration of the reduced product with ceric sulfate, the ceric sulfate solution having been standardized against iron wire, the purity of the U.S.P. product was found to be between 98.5 and 99.0%, whereas the purity of the present product was found to be between 92.0 and 95%.

The electrostatic, caking, dusting and mixing properties of the present product were found to be far superior to the U.S.P. material. The materials were tested for tendency to acquire electrostatic particle charges by producing an electrostatic surface charge on a glass rod, touching it to the material and then examining the rod to determine if the particles adhered thereto. It was found that the present product did not so adhere, whereas the U.S.P. material adhered strongly.

The two materials were tested for tendency to cake by pressing a portion of each against a solid surface with a spatula, and it was observed that the present product remained in the form of free-flowing particles, whereas the U.S.P. material cohered to form a cake-like mass.

The two materials were tested for tendency to form dusts of suspended particles by shaking equal portions of each in separate transparent containers, and then observing if particles remained in air suspension. It was found that the present product remained free-flowing and did not remain suspended, whereas the U.S.P. material merely cohered into small cake-like masses.

The materials were also tested for their adaptability to being mixed with other comminuted materials to yield free-flowing, substantially lump-free, physically homogeneous, finely divided products. Samples of each in equally finely divided form were mixed with finely comminuted calcite. The proportions employed were 4 g. of the menadione material to 450 g. of calcite. Each of the two samples was then blended for fifteen minutes in a Patterson-Kelley twin shell blender. The following observations were then made: The U.S.P. product agglomerated into small balls scattered throughout the mix, with some material adhering to the sides of the blender. The menadione product of the present invention was uniformly distributed throughout the mix with no agglomeration being observed and little if any material adhering to the sides of the blender.

A small portion of each sample was placed on a slide and observed through a microscope. The present product clearly produced a more uniform blend with the menadione completely dispersed, where as observation of the U.S.P. material under high magnification clearly showed that due to agglomeration blending was not uniform. In these mixing tests it was also noted that the present product was non-irritating, whereas the U.S.P. material produced irritation of the respiratory passages among personnel observing the mixing.

The two mixtures were then quartered and each quarter assayed independently. The samples were extracted with isopropyl alcohol and assayed by the ethylcyanoacetate colorimetric method, using the U.S.P. Reference Standard as a reference point. The results of these tests are as follows:

| Sample mixture | U.S.P. menadione, grams/pound | Product of present invention, grams/pound |
| --- | --- | --- |
| 1 | 3.50 | 3.80 |
| 2 | 4.32 | 3.94 |
| 3 | 3.31 | 3.71 |
| 4 | 4.17 | 3.86 |

The above analysis clearly indicates the uniformity of the mix made with the product of the present invention, and the foregoing tests clearly established the superior physical properties of the product of the present invention as compared with the U.S.P. material.

Having thus described the subject matter of this invention and how the same best may be practiced, what it is desired to secure by Letters Patent of the United States is:

I claim:

1. A process for producing substantially pure menadione which comprises leaching at a temperature within the range of ordinary room temperature to a temperature slightly above ordinary room temperature, lightly compressed comminuted crude menadione, contaminated with tarry by-products from oxidation of beta-methylnaphthalene with chromic oxide, with an organic solvent having inappreciable solvent and other action on menadione at the temperature and under the conditions of leaching selected from the group consisting of isopropanol, carbon tetrachloride, chloroethane, 1,1,1-trichloroethane, hexane, cyclohexane, ethylene dichloride, perchloroethylene, propylene dichloride, ethyl acetate, diisopropyl ether, cyclohexyl methyl ether, methyl phenyl ether, methyl ethyl ketone, toluene, monochlorobenzene and bromobenzene, and recovering purified menadione after removal of the leaching solvent.

2. A process as defined in claim 1 wherein the solvent is carbon tetrachloride.

3. A process as defined in claim 1 wherein the solvent is ethyl acetate.

4. A process as defined in claim 1 wherein the solvent is isopropanol.

5. A process as defined in claim 1 wherein the solvent is benzene.

6. A menadione product consisting essentially of about 92 to 95% by weight menadione and the balance tarry oxidation by-products of the oxidation of β-methylnaphthalene with chromic oxide but substantially free of water-soluble impurities, in the form of a free-flowing canary yellow solid, melting in the range 100° C. to 104° C., essentially free of tendency to cake, form dusts of suspended particles, acquire electrostatic particle charges, and adapted to being mixed with other comminuted materials in a blender and the like to yield a free-flowing, substantially lump-free, physically homogeneous, finely divided product.

References Cited in the file of this patent
UNITED STATES PATENTS
2,402,226    Hyman et al. _____ June 18, 1946

UNITED STATES PATENT OFFICE
CERTIFICATE OF CORRECTION

Patent No. 3,079,405

February 26, 1963

William Galler

It is hereby certified that error appears in the above numbered patent requiring correction and that the said Letters Patent should read as corrected below.

Column 6, lines 61 and 62, for "104° C." read -- 104.5° C. --.

Signed and sealed this 17th day of September 1963.

(SEAL)
Attest:

ERNEST W. SWIDER
Attesting Officer

DAVID L. LADD
Commissioner of Patents